United States Patent
Wang et al.

(10) Patent No.: US 9,312,702 B2
(45) Date of Patent: *Apr. 12, 2016

(54) SYSTEM AND METHODS FOR CONTROLLED DEPOWERING OF AUTOMOBILE BATTERIES

(71) Applicant: GM Global Technology Operations LLC, Detroit, MI (US)

(72) Inventors: Tao Wang, Oakland Township, MI (US); Tao Xie, Troy, MI (US); Yan Wu, Troy, MI (US); Xiaosong Huang, Novi, MI (US); Chih-Cheng Hsu, Rochester Hills, MI (US); Mahmoud Abd Elhamid, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 600 days.

This patent is subject to a terminal disclaimer.

(21) Appl. No.: 13/705,775

(22) Filed: Dec. 5, 2012

(65) Prior Publication Data

US 2013/0175998 A1 Jul. 11, 2013

Related U.S. Application Data

(60) Provisional application No. 61/568,377, filed on Dec. 8, 2011.

(51) Int. Cl.
| | |
|---|---|
| *H02J 7/00* | (2006.01) |
| *H01M 10/44* | (2006.01) |
| *H01M 6/50* | (2006.01) |
| *H01M 10/54* | (2006.01) |

(52) U.S. Cl.
CPC .. *H02J 7/00* (2013.01); *H01M 6/50* (2013.01); *H01M 10/44* (2013.01); *H01M 10/448* (2013.01); *H01M 10/54* (2013.01); *H02J 7/0031* (2013.01); *H02J 7/0063* (2013.01); *H02J 2007/0067* (2013.01); *Y02W 30/84* (2015.05)

(58) Field of Classification Search
CPC ..... H01M 6/50; H01M 10/448; H01M 10/44; H01M 10/54; H02J 7/0031; H02J 7/0063; H02J 2007/0067; H02J 7/00
USPC ........................................................ 320/135
See application file for complete search history.

(56) References Cited

U.S. PATENT DOCUMENTS

| | | | | |
|---|---|---|---|---|
| 4,407,909 | A | * | 10/1983 | Goebel ........................... 429/50 |
| 2010/0320970 | A1 | * | 12/2010 | Paczkowski .................. 320/127 |

FOREIGN PATENT DOCUMENTS

| | | | |
|---|---|---|---|
| FR | 3009440 A1 | * | 2/2015 |
| JP | 08306394 A | * | 11/1996 |
| JP | 2005347162 A | * | 12/2005 |

(Continued)

*Primary Examiner* — Yalkew Fantu
*Assistant Examiner* — Manuel Hernandez
(74) *Attorney, Agent, or Firm* — Quinn Law Group, PLLC (57) ABSTRACT

Methods and systems for depowering an automotive battery in a controlled manner. The methods comprise (i) providing a depowering medium comprising one or more non-ionic electric conductors (for example, a carbon conductor) dispersed in a substantially non-ionic aqueous medium; (ii) contacting terminals of the battery with the depowering medium; and (iii) maintaining contact between the depowering medium and terminals for a period of time sufficient to depower the battery. The systems comprise (i) the depowering medium; and (ii) a container configured to receive a battery and the depowering medium such that the battery body is contacted with the depowering medium prior to the terminals.

19 Claims, 4 Drawing Sheets (56) References Cited

FOREIGN PATENT DOCUMENTS

| JP | 2010277737 | A | * | 12/2010 |
| JP | 2012033345 | A | * | 2/2012 |
| JP | 2012038521 | A | * | 2/2012 |
| WO | WO 2013172271 | A1 | * | 11/2013 |
| WO | WO 2014017085 | A1 | * | 1/2014 |
| WO | WO 2014017086 | A1 | * | 1/2014 |

* cited by examiner

SYSTEM AND METHODS FOR CONTROLLED DEPOWERING OF AUTOMOBILE BATTERIES

This application claims the benefit of U.S. Provisional Application Ser. No. 61/568,377 filed Dec. 8, 2011.

FIELD

The present disclosure relates to depowering automotive batteries in a controlled manner, and more particularly to using an aqueous solution containing one or more dispersible electric conductors to depower such batteries.

BACKGROUND

Various batteries, including lithium-ion, lead acid and nickel-metal hydride variants, may be configured to have rechargeable attributes. Such batteries may be used as a rechargeable energy storage system (RESS) as a way to supplement or supplant conventional internal combustion engines (ICEs) for automotive applications. The ability to passively store energy from stationary and portable sources, as well as from recaptured kinetic energy provided by the vehicle and its components, makes batteries (in general) and rechargeable batteries (in particular) ideal to serve as part of a propulsion system for cars, trucks, buses, motorcycles and related vehicular platforms. Several such batteries may typically be combined in a module, section, or pack to generate the desired power and energy output.

Because an energized battery cell, module, section or pack is capable of producing large amounts of energy, there may be circumstances where depowering is desired. For example, where an energized battery is to be stored, transported, or handled, it may be desirable to depower the battery. Conventional methods of depowering an intact rechargeable battery involve using an electrical circuit or a load bank. Under circumstances where such conventional methods are not applicable, feasible or limited, an ionically-conductive aqueous solution, dispersion or suspension can be used to depower the battery. In one form, such solution may include sodium chloride, sodium sulfate, or other salts. While useful for providing an electrolytic medium and the related depowering of electric batteries, such solutions can lead to corrosion of sensitive battery components (such as tabs, leads or the like) and the evolution of gaseous byproducts (specifically, hydrogen, oxygen and chlorine) during battery depower. Corrosion of the positive end of a battery complicates the depowering process and can allow for the aqueous solution to enter the battery and cause severe damage to the battery electrodes. Moreover, such solutions can lead to temperature spikes during the depowering process, thereby subjecting battery separators, electrodes, electrolytes and other components to damaging temperatures.

SUMMARY

In various embodiments, provided are methods and systems for depowering a battery in a controlled manner so as to, among other things, inhibit evolution of gases and rapid heat release. The battery may be selected from lithium-ion, lead acid, and nickel-metal hydride batteries. Accordingly, the provided methods and systems are suitable for use with automotive batteries, including those used as part of a rechargeable energy storage system (RESS).

In some of the various embodiments, the provided methods of controlled battery depowering comprise (i) providing a battery to be depowered; (ii) providing a substantially non-ionic depowering medium comprising one or more dispersible electric conductors that are ionically neutral; (iii) contacting positive and negative terminals of the battery with the depowering medium; and (iv) maintaining contact between the depowering medium and the terminals for a period of time sufficient to depower the battery. The depowering medium can be prepared by (i) providing a substantially non-ionic aqueous medium; (ii) providing one or more dispersible non-ionic electric conductors; and (iii) dispersing the electric conductor(s) in the aqueous medium in a manner sufficient to form a uniform mixture (for example, a slurry, suspension, or related mixture). In some embodiments, at least one of the electric conductors is a carbon conductor and the depowering medium formed has rheological characteristics that take advantage of the fluid's tunable electrically conductive properties to depower a battery in a controlled manner. By using a non-ionic electric conductor (instead of an ionic conductor such as salt or sea water), gassing reactions of $H_2$ and $O_2$ may be reduced or avoided, as can tab corrosion issues.

Also provided in some of the various embodiments are systems for controlled battery depowering. In some of such embodiments, a provided system is configured to supply depowering medium to the interior of a battery, module, section, or pack. Such a system comprises (a) a container that contains (or is configured to receive) (i) a substantially non-ionic aqueous medium; (ii) one or more non-ionic electric conductors; or (iii) both; (b) one or more lines (for example, pipes, tubes, or hoses) configured to fluidly connect the container and the battery, module, section, or pack; and (c) a pressurizing device fluidly connected to the container, one or more lines, and battery, module, section, or pack. In some embodiments, the depowering medium is supplied to the container. In other embodiments, one or more components are supplied to the container and the depowering medium is formed therein by mixing. In such embodiments, the provided system may optionally have (a) a supply line for the aqueous medium; (b) an electric conductor supply cartridge or container; or (c) both, located upstream of the container. In operation of such systems, depowering medium is supplied to the interior of the battery, module, section, or pack to be depowered and circulated therethrough for a period of time sufficient to depower in a controlled manner.

In other embodiments, the provided system is configured to supply depowering medium to the exterior of a battery, module, section, or pack. Such a system comprises (i) a substantially non-ionic depowering medium comprising one or more dispersible electric conductors; and (ii) a container configured to (a) receive a battery to be depowered; and to (b) receive the depowering medium such that a battery body is contacted with the depowering medium prior to positive and negative battery terminals (or voltage tabs) being contacted with the depowering medium. In some embodiments, the depowering medium comprises a carbon conductor. In operation, a battery to be depowered is received in the container of the system, and the depowering medium is supplied to the container such that the terminals/tabs of the battery, module, section, or pack are contacted with the depowering medium for a period of time sufficient to depower in a controlled manner.

BRIEF DESCRIPTION OF THE DRAWINGS

A more complete appreciation of the many embodiments of the present disclosure will be readily obtained as the same becomes better understood by reference to the following detailed description when considered in connection with the accompanying drawings, wherein.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete and will fully convey the scope of the same to those skilled in the art.

Unless otherwise defined, all technical and scientific terms used herein have the same meaning as commonly understood by one of ordinary skill in the art to which this disclosure belongs. The terminology used in the present disclosure is for describing particular embodiments only and is not intended to be limiting. As used in the specification and appended claims, the singular forms "a," "an," and "the" are intended to include the plural forms as well, unless the context clearly indicates otherwise.

Recitations of "at least one" component, element, etc. in the present disclosure and appended claims should not be used to create an inference that the alternative use of the articles "a" or "an" should be limited to a single component, element, etc.

In the present disclosure and appended claims, recitations of a component being "configured" to embody a particular property, or function in a particular manner, are structural recitations, as opposed to recitations of intended use. More specifically, references to the manner in which a component is "configured" denotes an existing physical condition of the component and, as such, is to be taken as a definite recitation of the structural characteristics of the component.

As used in the present disclosure and appended claims, terms like "preferably," "commonly," and "typically" are not utilized to limit the scope of the claims or to imply that certain features are critical, essential, or even important to the structure or function of the claimed embodiments. Rather, these terms are merely intended to identify particular aspects of an embodiment of the present disclosure or to emphasize alternative or additional features that may or may not be utilized in a particular embodiment of the present disclosure.

The terms "substantially" and "approximately," as used in the present disclosure and appended claims, represent the inherent degree of uncertainty that may be attributed to any quantitative comparison, value, measurement, or other representation. Such terms are also utilized to represent the degree by which a quantitative representation may vary from a stated reference without resulting in a change in the basic function of the subject matter at issue.

As used in the present disclosure and appended claims, the term "automotive" is intended to refer to cars, trucks, buses, motorcycles, and related vehicular platforms.

The term "battery," as used in the present disclosure and appended claims, is intended to encompass an individual electrochemical cell configured to delivery electric current to a load, as well as a battery module, section, or pack comprising a plurality of such electrochemical cells. Thus, unless the context clearly indicates otherwise, the terms are used interchangeably herein.

Unless otherwise indicated, all numbers expressing quantities, properties, conditions, and so forth as used in the specification and claims are to be understood as being modified in all instances by the term "about." Additionally, the disclosure of any ranges in the specification and claims are to be understood as including the range itself and also anything subsumed therein, as well as endpoints. Notwithstanding that numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

Methods

In various embodiments, provided are methods of controlled depowering of a battery. Among other things, such methods are configured to depower a battery while inhibiting evolution of gases and rapid heat release, and they are suitable for use in controlled depowering regardless of the condition or format of the battery. Generally, the provided methods comprise (i) providing a battery to be depowered; (ii) providing a substantially non-ionic depowering medium comprising one or more dispersible electric conductors that are ionically neutral; (iii) contacting positive and negative terminals of the battery with the depowering medium; and (iv) maintaining contact between the depowering medium and the positive and negative terminals for a period of time sufficient to depower the battery.

While the present disclosure is not limited to specific applications, in some embodiments, the battery to be depowered is an automotive battery. Thus, the battery may be selected from lithium-ion, lead acid, and nickel-metal hydride batteries. Accordingly, the provided methods may be used with batteries that are part of a rechargeable energy storage system (RESS) of a vehicle. An automotive battery is typically configured to have a positive terminal, a negative terminal, and a body that comprises one or more electrochemical cells. In the provided methods, depowering of the battery (whether alone or as part of a module, section, or pack) comprises applying a depowering medium across the positive and negative battery terminals (or voltage tabs). In some embodiments, such contact does not occur until after the battery body has been contacted with the depowering medium.

In addition to providing a battery to be depowered, the provided methods comprise providing a depowering medium comprising one or more dispersible non-ionic electric conductors. In some embodiments, the depowering medium is provided in an application-ready form (i.e. pre-mixed or partially pre-mixed with appropriate quantities of components). In other embodiments, the depowering medium must be prepared. Accordingly, the provided methods may further comprise forming the depowering medium by (i) providing a substantially non-ionic aqueous medium; (ii) providing the one or more dispersible electric conductors; and (iii) dispersing the one or more dispersible electric conductors in the aqueous medium in a manner sufficient to form a uniform mixture (for example, a slurry, suspension, or related mixture). The depowering medium can be prepared at the site of depowering or beforehand. For example, the one or more dispersible electric conductors (along with any dispersing agents and/or thickeners desired) can be provided pre-mixed and dispersed in water available at the site of depowering. As another example, the depowering medium can be completely prepared in advance of depowering and transported to the depowering site. As yet another example, the individual components can be transported to the depowering site and combined there to form the depowering medium.

The substantially non-ionic aqueous medium comprises water that has a low salt content. Accordingly, the water may be selected from tap water, distilled water, de-ionized water, filtered water, or water from a fresh water source (for example, spring, lake, pond, or river). Water is a particularly useful aqueous medium because of its ability to manage the heat generated during battery depowering, as well as being environmentally-neutral in the event of a spill. Moreover, aqueous solutions made from such ingredients are low-cost. It is important, however, to avoid use of ionic water sources (for example, sea water). The substantially non-ionic aqueous medium may, in some embodiments, also comprise ethylene glycol, which also aids in absorption of heat generated during depowering. The amount of ethylene glycol present can, in some embodiments, be from about 10 to about 50 weight percent (wt %). Thus, the aqueous medium may comprise 10-15 wt %, 15-20 wt %, 20-25 wt %, 25-30 wt %, 30-35 wt %, 35-40 wt %, 40-45 wt %, 45-50 wt % ethylene glycol.

In some embodiments, the substantially non-ionic aqueous medium may also comprise one or more dispersing agents in order to promote the uniform suspension and dispersion of the electric conductor therein. The dispersing agent(s) chosen should be non-ionic. Examples of suitable dispersing agents include, but are not limited to, starch, styrene-butadiene-rubber, sodium carboxymethyl cellulose, polyethylene oxide, and polyvinyl alcohol. By making the depowering medium more homogenous, issues of electric conductor agglomeration are avoided. The amount of dispersing agent present can, in some embodiments, be from about 1 to about 15 wt %. Accordingly, the aqueous medium may comprise 1-3 wt %, 3-6 wt %, 6-9 wt %, 9-12 wt %, 12-15 wt % dispersing agent.

Whether the substantially non-ionic aqueous medium comprises only water; water and ethylene glycol; water and dispersing agent; or water, dispersing agent, and ethylene glycol, a depowering medium comprises one or more dispersible electric conductors that are ionically neutral. In some embodiments, the dispersible electric conductor may be a carbon conductor selected from carbon black, carbon fiber, and combinations thereof. Use of carbon conductors helps prevent corrosion of the battery cell, module and pack components (such as tabs, terminals, bus bar, electrical circuitry, and electrodes). Good results have been achieved with carbon black. The amount of carbon conductor present in the depowering medium should be sufficient to provide enough conductivity to depower the battery but not enough to cause rapid depowering. In some embodiments, the amount of carbon conductor present in the depowering medium may be from about 1 to about 25 wt %. Accordingly, the depowering medium may comprise 1-5 wt %, 5-10 wt %, 10-15 wt %, 15-20 wt %, 20-25 wt % carbon conductor. In one example, the depowering medium may have 7 wt % carbon black. In another example, the depowering medium may have 15 wt % carbon black.

In some embodiments, the depowering medium may also comprise one or more dispersible electric conductors selected from metallic powders and low melting point metallic alloys that are liquids at room temperatures. Such materials may be used to reduce the electrical resistance of the depowering medium while maintaining an aqueous environment so as to help maintain good thermal management during the depowering process. One example of a suitable alloy is Ga—In—Sn, which has reasonably good electrical and thermal conductivities relative to other electrically conductive fluids. Examples of suitable metallic powders include copper, zinc, iron and nickel. Whether the depowering medium comprises only carbon conductor or carbon conductor and one or more other dispersible electric conductors, such conductors are dispersed in the aqueous medium in a manner sufficient to form a uniform mixture (for example, a slurry, suspension, or related mixture). Mixing can be achieved through use of an industrial mixing apparatus, a non-industrial mixing apparatus, or by hand mixing.

In addition to the aforementioned components, in some embodiments, the depowering medium may comprise one or more thickeners in order to help stabilize the depowering medium. One of skill will be familiar with suitable thickeners. Some dispersing agents (for example sodium carboxymethyl cellulose) may also be used as thickeners. While thickeners may optionally be used, care must be taken to avoid overly high viscosity. Furthermore, the use of thickening agents must be balanced against the need for a desired level of conductivity.

In some embodiments, the depowering medium used in the methods has a viscosity of from about 100 cP to about 50,000 cP. Accordingly, the viscosity may be 100-1000 cP; 1000-5000 cP; 5000-10,000 cP; 10,000-15,000 cP; 15,000-20,000 cP; 20,000-25,000 cP; 25,000-30,000 cP; 30,000-35,000 cP; 35,000-40,000 cP; 40,000-45,000 cP; 45,000-50,000 cP. The depowering medium may, in some embodiments, have a resistivity of from about 0.5 $\Omega \cdot cm$ to about 100 $\Omega \cdot cm$. Accordingly, the resistivity may be 0.5-5 $\Omega \cdot cm$, 5-10 $\Omega \cdot cm$, 10-15 $\Omega \cdot cm$, 15-20 $\Omega \cdot cm$, 20-25 $\Omega \cdot cm$, 25-30 $\Omega \cdot cm$, 30-35 $\Omega \cdot cm$, 35-40 $\Omega \cdot cm$, 40-45 $\Omega \cdot cm$, 45-50 $\Omega \cdot cm$, 50-55 $\Omega \cdot cm$, 55-60 $\Omega \cdot cm$, 60-65 $\Omega \cdot cm$, 65-70 $\Omega \cdot cm$, 70-75 $\Omega \cdot cm$, 75-80 $\Omega \cdot cm$, 85-90 $\Omega \cdot cm$, 90-95 $\Omega \cdot cm$, 95-100 $\Omega \cdot cm$.

Figure 2:
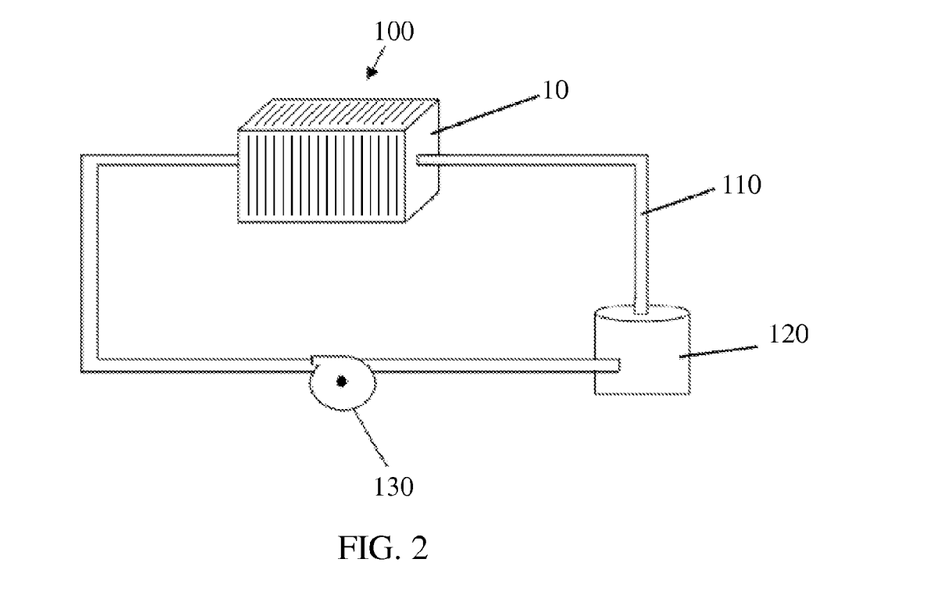
FIG. 2 shows, in simplified form, one way a battery may be depowered using certain provided systems and methods, namely by supplying depowering medium to the interior of a battery.
Figure 3:
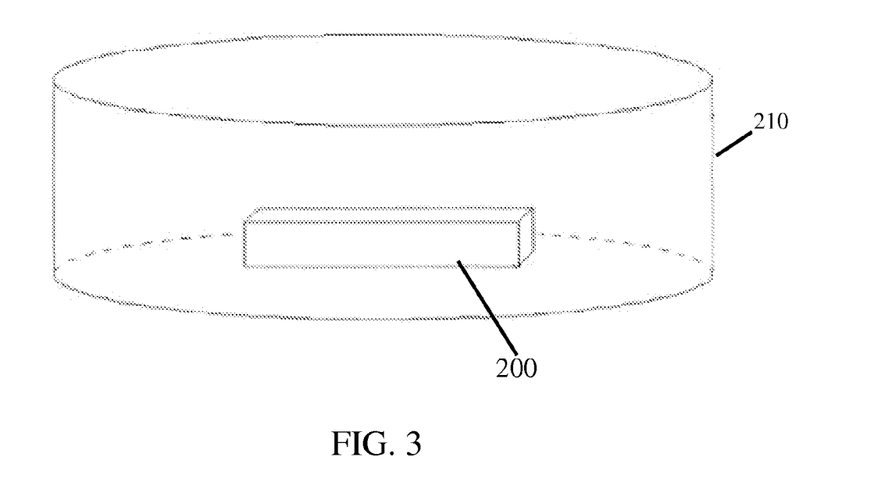
FIG. 3 illustrates, in simplified form, another way a battery may be depowered using certain provided systems and methods, namely by supplying depowering medium to the exterior of a battery.
Figure 4:
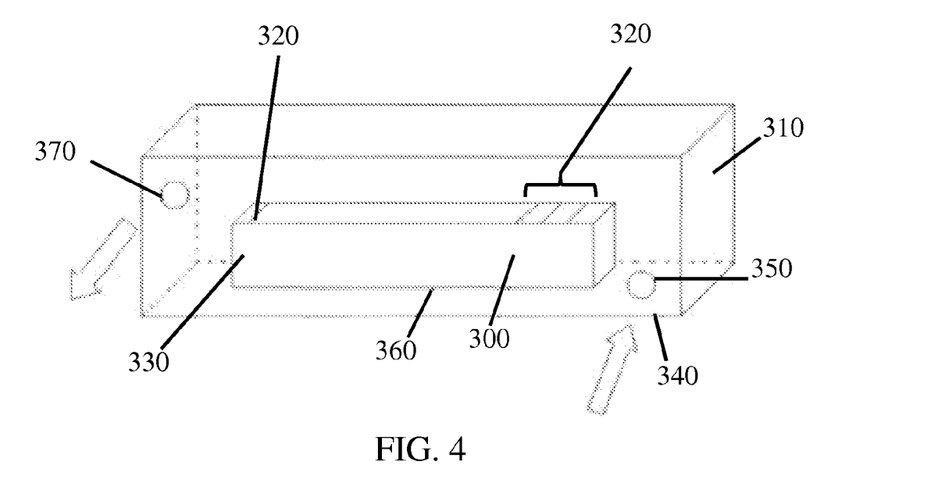
FIG. 4 illustrates, in simplified form, yet another way a battery may be depowered using certain provided system and methods, namely by supplying depowering medium to the exterior of a battery.

In addition to providing a battery and a depowering medium, the provided methods comprise contacting positive and negative terminals (or voltage tabs) of the battery with the depowering medium. Such contact can be achieved in a variety of ways without departing from the scope of the present disclosure. One example (which is illustrated in FIG. 2) is pumping depowering medium into a battery, module, section, or pack. In such an example, the substantially non-ionic aqueous medium, one or more non-ionic electric conductors, or both, may be housed in or supplied to a chamber wherein they are mixed and pumped to a battery, module, section, or pack configured to be connectable to such a system. Another example (which is illustrated in FIG. 3 and FIG. 4) is disposing a battery into a container configured to contain a fluid and providing sufficient depowering medium into the container to immerse the battery. In such an example, the container can be, but does not have to be, one specifically configured for use with the provided methods. An example of a container configured for use with the provided methods is one comprising a bottom portion and one or more fluid inlets disposed in, or proximate to, the bottom portion, such container being configured to (i) receive the battery; and (ii) receive the depowering medium through the one or more fluid inlets such that the battery body is contacted with the depowering medium prior to the positive and negative battery terminals being contacted with the depowering medium.

In addition to providing a battery, providing a depowering medium, and contacting positive and negative terminals (or voltage tabs) of the battery with the depowering medium, the provided methods comprise maintaining contact between the depowering medium and the positive and negative terminals (or voltage tabs) for a period of time sufficient to depower the battery. In some embodiments, a sufficient period of time may be from about 1 to about 20 hours. Accordingly, in such embodiments contact between the depowering medium and the battery terminals/tabs may be 1-2 hours, 2-4 hours, 4-6 hours, 6-8 hours, 8-10 hours, 10-12 hours, 12-14 hours, 14-16 hours, 16-18 hours, 18-20 hours. In some embodiments, a sufficient period of time may be from about 1 to about 72 hours. Accordingly, in such embodiments contact between the depowering medium and the battery terminals/tabs may be 1-8 hours, 8-16 hours, 16-24 hours, 24-32 hours, 32-40 hours, 40-48 hours, 48-56 hours, 56-64 hours, 64-72 hours. Good results have been achieved with a period of time of 4-24 hours.

In some embodiments, depowering is controlled such that the battery (or components thereof) is maintained at temperatures sufficient to prevent critical damage. For example, it may be desirable to maintain the average temperature below 90° C. so as to avoid damaging, among other components, a polymeric separator existing between the anode and cathode. In other examples, it may be desirable to maintain the average temperature below 90° C.-95° C., 95° C.-100° C. Additionally, the provided methods allow for controlled depowering while inhibiting evolution of $H_2$, $O_2$, and $Cl_2$ or other gases. This is because the carbon conductor shunts the terminals/tabs while electrolysis is inhibited.

Systems

In various embodiments, also provided in the present disclosure are systems for controlled battery depowering. Some embodiments of such systems are configured for supplying depowering medium to the interior of a battery, module, section, or pack, whereas other embodiments of such systems are configured for supplying depowering medium to the exterior of a battery, module, section, or pack. Regardless of the type of configuration, the depowering medium used in the provided systems is that disclosed with respect to the provided methods. Thus, the depowering medium comprises one or more dispersible non-ionic electric conductors uniformly dispersed in a substantially non-ionic aqueous medium. Moreover, in some embodiments, at least one of the dispersible electric conductors is a carbon conductor.

In those embodiments wherein the system is configured to supply depowering medium to the interior of the battery, the system generally comprises (a) a container that contains (or is configured to receive) (i) a substantially non-ionic aqueous medium; (ii) one or more non-ionic electric conductors; or (iii) both; (b) one or more lines (for example, pipes, tubes, or hoses) configured to fluidly connect the container and the battery to be depowered; and (c) a pressurizing device (for example, a pump) fluidly connected to the container, one or more lines, and battery. Thus, the system comprises depowering medium. However, the depowering medium may be supplied to the container, or one or more components of the depowering medium may be supplied to the container and the depowering medium formed in situ. In the latter embodiments, the provided system may optionally comprise (a) a supply line for the aqueous medium; (b) an electric conductor supply cartridge or container; or (c) both, located upstream of the container. In operation of the provided system, depowering medium is supplied to the interior of the battery and circulated therethrough for a period of time sufficient to depower in a controlled manner.

In those embodiments wherein the system is configured to supply depowering medium to the exterior of the battery, the system generally comprises (i) depowering medium; and (ii) a container configured to (a) receive a battery to be depowered, such battery having a positive terminal, a negative terminal, and a body comprising one or more electrochemical cells; and to (b) receive the depowering medium such that the battery body is contacted with the depowering medium prior to the positive and negative battery terminals being contacted with the depowering medium. In operation of the provided system, the battery is received in the container, and the depowering medium is supplied to the container such that the positive and negative terminals of the battery are contacted with the depowering medium for a period of time sufficient to depower the battery.

The container used in the system may, in some embodiments, comprise a bottom portion and one or more fluid inlets disposed in, or proximate to, the bottom portion. In such embodiments, the container is configured to receive the depowering medium through the one or more fluid inlets such that the battery body (for example, the bottom of the battery) is contacted with the depowering medium prior to the positive and negative battery terminals being contacted with the depowering medium.

EXAMPLES

The described embodiments will be better understood by reference to the following examples which are offered by way of illustration and which one of skill in the art will recognize are not meant to be limiting.

Example 1

Figure 1:
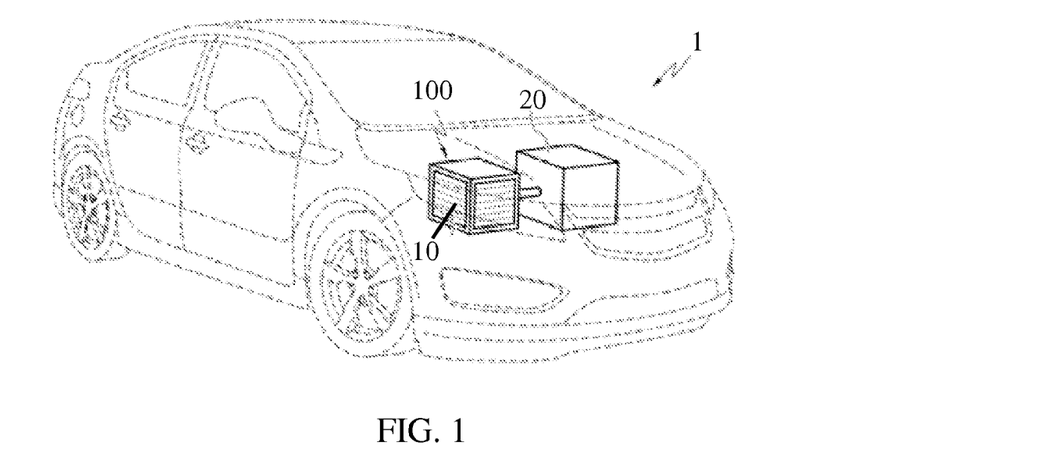
FIG. 1 illustrates a vehicle with a hybrid propulsion system in the form of a battery module and an internal combustion engine.

Referring to FIG. 1, a vehicle 1 includes a hybrid propulsion system in the form of a conventional ICE 20 and a battery module 100 made up of numerous battery cells 10. Such a vehicle is known as a hybrid electric vehicle (HEV). It will be appreciated by those skilled in the art that vehicle 1 may not require an ICE 20; in such case, rather than being an HEV, it is an electric vehicle (EV); either form is within the scope of the present disclosure. The individual battery cells 10 are typically arranged in a repeating array as shown. In one typical example, battery module 100 may have two hundred individual battery cells 10, although it will be appreciated by those skilled in the art that additional or fewer cells 10 may be needed, depending on the power and energy required. Additional drivetrain components (none of which are shown) useful in providing propulsive power to one or more of the wheels and coupled to one or both of the battery module 100 and ICE 20 are understood to include electric motors, rotating shafts, axles, transmission or the like.

FIG. 2 illustrates one example of a method and system for depowering a battery module 100. In such method, a substantially non-ionic aqueous medium is supplied to a container 120 that contains (or that is configured to receive) carbon black, thereby forming a depowering medium. The aqueous medium may be supplied to the container 120 through a conventional fluid line (not shown). After appropriate mixing in the container 120, the resulting depowering medium is supplied to the battery module 100 through a fluid line 110 and circulated to the cells 10 thereof. In a variation on the embodiment depicted in FIG. 2, a cartridge or container (not shown) for holding the carbon black may be placed upstream of container 120. In either configuration, a pressurizing device (such as a pump) 130 may be used to facilitate the delivery of the aqueous medium to the container 120 and the depowering medium to the battery module 100. Ancillary equipment (such as valves, controllers or the like, none of which are shown) are also understood to be present as part of the system.

Example 2

Referring to FIG. 3, illustrated is one example of a method and system for depowering a battery pack 200. In such method, the battery pack 200 is disposed in a container 210 configured to receive and contain a fluid. Enough depowering medium (for example, carbon black suspended in water or water/ethylene glycol) is supplied to the container 210 to contact positive and negative terminals (not shown). In one variation on the embodiment depicted in FIG. 3, the depowering medium can be supplied to the container 210 and the battery pack 200 can be lowered into the depowering medium. In another variation on the embodiment depicted in FIG. 3, the depowering medium can be prepared in the container 210 by supplying the aqueous medium, one or more dispersible electric conductors (for example, carbon black), and other optional components (for example, dispersing agent or thickener) and mixing them in the container 210 to form the depowering medium. Ancillary equipment (not shown) is also understood to be present as part of the depicted system.

Example 3

Referring to FIG. 4, illustrated is one example of a method and system for depowering a battery 300. In such method, the battery 300 is disposed in a container 310 configured to (a) receive a battery 300 having positive and negative terminals (voltage taps) 320 and a body 330 comprising a plurality of electrochemical cells; and to (b) receive a depowering medium in a manner wherein the battery body 330 is contacted with the depowering medium prior to the voltage taps 320 being contacted with the depowering medium. In order to achieve such contact, the container 310 comprises a bottom portion 340 and a fluid inlet 350 disposed in, or proximate to, the bottom portion 340. The container receives depowering medium through the fluid inlet 350 such that the bottom 360 of the battery 300 is contacted with the depowering medium prior to the voltage taps 320 being contacted with the depowering medium. Optionally, the container 310 can have a fluid outlet 370 wherein depowering medium supplied to the container 310 can be removed. The fluid inlet 350 and fluid outlet 370 may be connected as part of a closed loop system. A pressurizing device (not shown) may be used to facilitate flow of the depowering medium to the container 310. Ancillary equipment (such as valves, controllers or the like, none of which are shown) are also understood to be present as part of the depicted system.

Example 4

Figure 5:
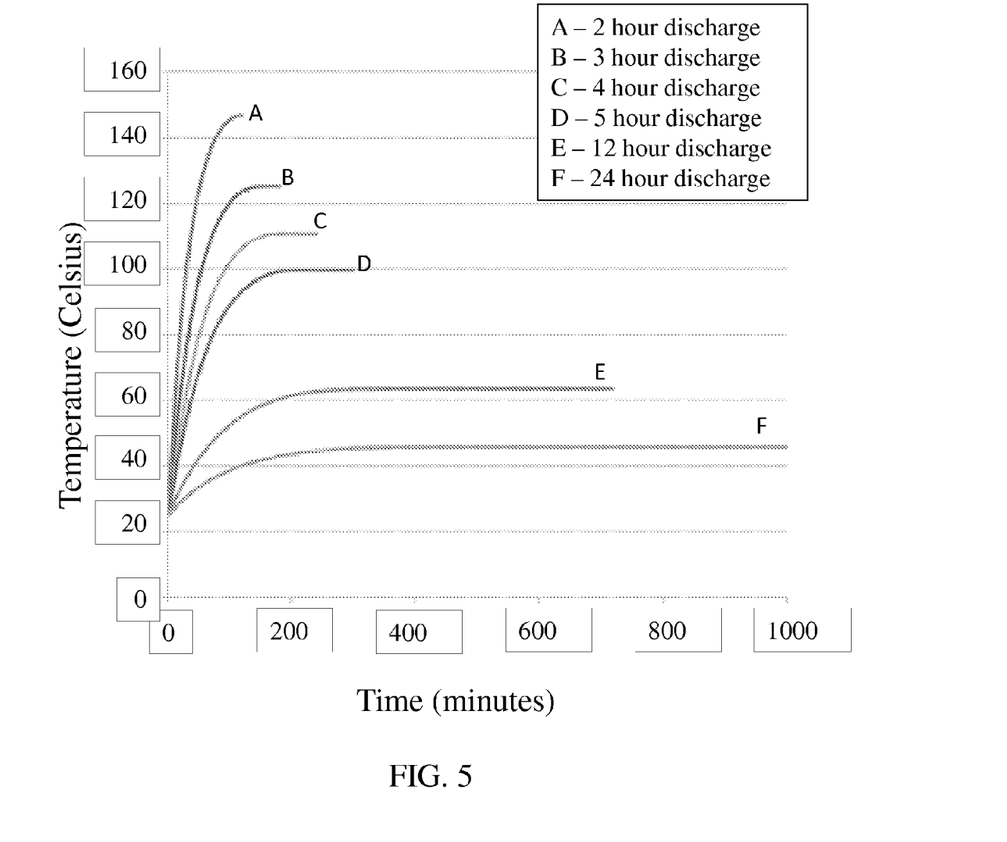
FIG. 5 is a simulated temperature profile of battery module depowering with respect to two, three, four, five, twelve and twenty-four depower rates.

The provided methods involve a depowering medium having tunable composition and resulting conductivity and viscosity. This allows for controlled battery depower rates. In turn, this allows for control of the heat generation rate during depower, where in general the higher the charge rate, the higher heat generation rate during each unit of time of depower. FIG. 5 illustrates this latter point by showing that temperature spikes can be avoided by controlled depowering over time. While the profiles of FIG. 5 are based upon water being the depowering medium, improvement can occur by tuning the components of the depowering medium (for example, by using carbon black, a dispersing agent, or both). It is important to avoid damaging temperatures (for example, those about 90° C.) in the vicinity of battery separators, electrodes, electrolytes and other internal components. While water aids in this endeavor due to relative high thermal mass, other heat absorbing materials (for example, ethylene glycol) can also be present.

Example 5

Figure 6:
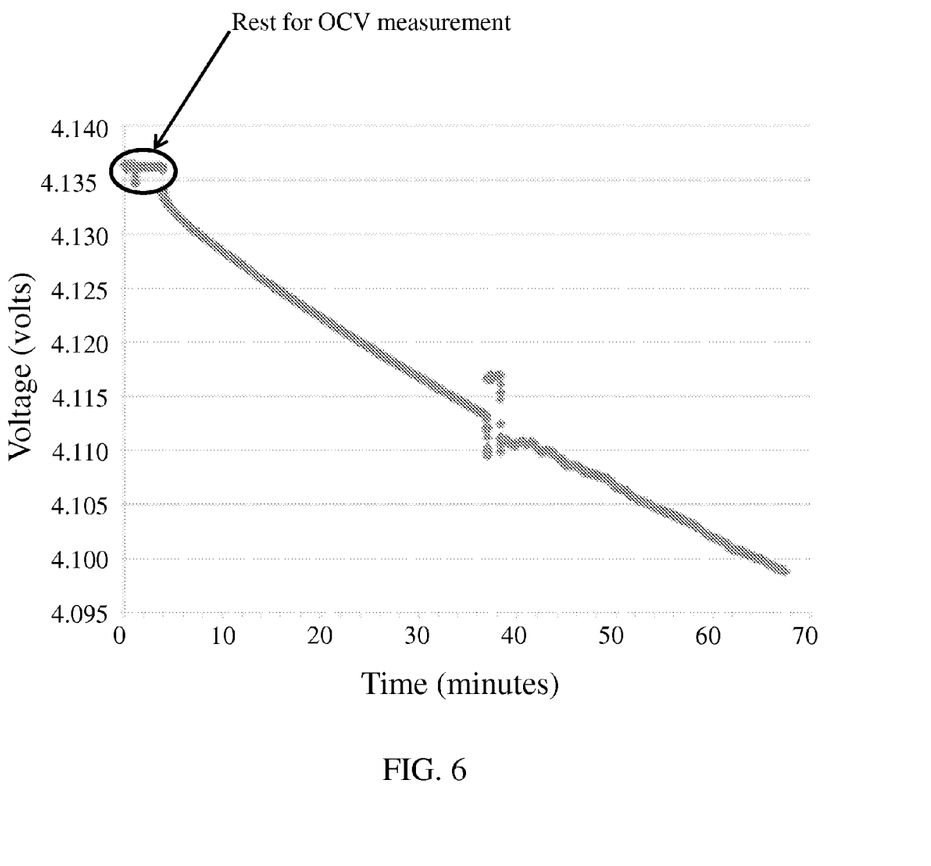
FIG. 6 illustrates a detailed view of the depower of a battery using a carbon black-based depowering medium for approximately one hour.

Referring next to FIG. 6, shown are the results of a depowering medium according to an embodiment of the present disclosure being introduced into a battery module. The depowering medium is made up of 7 weight percent carbon black and 4 weight percent dispersing agent (for example, starch) suspended in water. The component concentrations used ensured proper conductivity and viscosity required to depower the battery, but not so high that the ability of the solution to flow was adversely affected. The battery was depowered over a period of about one hour with temperature well under control (i.e., no rapid heat release or damaging temperatures). In other applications, depowering times up to 20 hours were also observed with temperatures also controlled.

The present disclosure should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A method of controlled battery depowering, comprising:
providing an automotive battery to be depowered;
providing a substantially non-ionic depowering medium comprising between 1 and 25 weight percent carbon conductor uniformly dispersed in a substantially non-ionic aqueous medium;
contacting positive and negative terminals of the battery with the depowering medium; and
maintaining contact between the depowering medium and the positive and negative terminals for a period of time sufficient to depower the battery;
wherein increases in battery temperature and evolution of $H_2$, $O_2$, and $Cl_2$ are controlled during depowering.

2. A method according to claim 1, comprising forming the depowering medium by (i) providing the substantially non-ionic aqueous medium; (ii) providing the carbon conductor; (iii) dispersing the carbon conductor in the substantially non-ionic aqueous medium; and (iv) mixing to form a uniform mixture.

3. A method according to claim 1, wherein the battery is selected from lithium-ion, lead acid, and nickel-metal hydride batteries.

4. A method according to claim 1, wherein the aqueous medium comprises between 10 and 50 weight percent ethylene glycol.

5. A method according to claim 1, wherein the aqueous medium comprises between 1 and 15 weight percent of dispersing agent selected from starch, styrene-butadiene-rubber, sodium carboxymethyl cellulose, polyethylene oxide, polyvinyl alcohol, and combinations thereof.

6. A method according to claim 1, wherein the carbon conductor is selected from carbon black, carbon fiber, and combinations thereof.

7. A method according to claim 6, wherein the depowering medium has a viscosity of between 100 and 50,000 centipoise.

8. A method according to claim 6, wherein the depowering medium has a resistivity of between 0.5 and 100 ohms centimeters.

9. A method of controlled battery depowering, comprising:
providing an automotive battery to be depowered disposed within a container configured to receive a fluid, the battery selected from lithium-ion, lead acid, and nickel-metal hydride batteries;
providing a substantially non-ionic depowering medium comprising between 1 and 25 weight percent carbon conductor uniformly dispersed in a substantially non-ionic aqueous medium, the carbon conductor selected from carbon black, carbon fiber, and combinations thereof;
supplying the depowering medium to the container such that positive and negative terminals of the battery are contacted with the depowering medium; and
maintaining contact between the depowering medium and the positive and negative terminals for a period of time sufficient to depower the battery;
wherein increases in battery temperature and evolution of $H_2$, $O_2$, and $Cl_2$ are controlled during depowering.

10. A method according to claim 9, comprising forming the depowering medium by (i) providing the substantially non-ionic aqueous medium; (ii) providing the carbon conductor; (iii) dispersing the carbon conductor in the substantially non-ionic aqueous medium; and (iv) mixing to form a uniform mixture.

11. A method according to claim 9, wherein the aqueous medium comprises between 10 and 15 weight percent ethylene glycol.

12. A method according to claim 9, wherein the aqueous medium comprises between 1 and 15 weight percent of one or more dispersing agents selected from starch, styrene-butadiene-rubber, sodium carboxymethyl cellulose, polyethylene oxide, and polyvinyl alcohol.

13. A method according to claim 9, wherein the depowering medium has a viscosity of between 100 and 50,000 centipoise and a resistivity of between 0.5 and 100 ohm centimeters.

14. A method according to claim 9, wherein the container comprises one or more fluid inlets disposed in, or proximate to, a bottom portion of the container; and the depowering medium is supplied to the container through the one or more fluid inlets such that a battery body is contacted with the depowering medium prior to the positive and negative terminals being contacted with the depowering medium.

15. A system for controlled battery depowering, comprising:
a substantially non-ionic depowering medium comprising between 1 and 25 weight percent carbon conductor uniformly dispersed in a substantially non-ionic aqueous medium; and
a container comprising a bottom portion and one or more fluid inlets disposed in, or proximate to, the bottom portion, the container being configured to (i) receive an automotive battery to be depowered, such battery having a body, a positive terminal, and a negative terminal; and to (ii) receive the depowering medium through the one or more fluid inlets such that the battery body is contacted with the depowering medium prior to the positive and negative battery terminals being contacted with the depowering medium.

16. A system according to claim 15, wherein the depowering medium comprises between 10 and 50 weight percent ethylene glycol.

17. A system according to claim 15, wherein the depowering medium comprises between 1 and 15 weight percent of one or more dispersing agents selected from starch, styrene-butadiene-rubber, sodium carboxymethyl cellulose, polyethylene oxide, and polyvinyl alcohol.

18. A system according to claim 15, wherein the carbon conductor is selected from carbon black, carbon fiber, and combinations thereof.

19. A system according to claim 18, wherein the depowering medium has a viscosity of between 100 and 50,000 centipoise and a resistivity of between 0.5 and 100 ohm centimeter.

* * * * *